United States Patent [19]

Pidcock et al.

[11] 4,446,693

[45] May 8, 1984

[54] WALL STRUCTURE FOR A COMBUSTION CHAMBER

[75] Inventors: Anthony Pidcock, Shelton Lock; George Pask, Stanton-by-Bridge, both of England

[73] Assignee: Rolls-Royce Limited, London, England

[21] Appl. No.: 312,985

[22] Filed: Oct. 20, 1981

[30] Foreign Application Priority Data

Nov. 8, 1980 [GB] United Kingdom ................. 8035956

[51] Int. Cl.³ ............................ F02C 7/12; F02C 7/20

[52] U.S. Cl. ...................................... 60/39.32; 60/757; 60/758

[58] Field of Search ................. 60/752, 754, 755, 757, 60/39.32, 756, 758-760; 428/119, 120, 13.8

[56] References Cited

U.S. PATENT DOCUMENTS

| | | | |
|---|---|---|---|
| 2,547,619 | 4/1951 | Buckland | 60/756 |
| 4,064,300 | 12/1977 | Bhangu | 60/757 |
| 4,184,326 | 1/1980 | Pane et al. | 60/39.32 |

FOREIGN PATENT DOCUMENTS

| | | | |
|---|---|---|---|
| 1291554 | 3/1969 | Fed. Rep. of Germany . | |
| 763692 | 12/1956 | United Kingdom . | |
| 791051 | 2/1958 | United Kingdom . | |
| 790293 | 2/1958 | United Kingdom . | |
| 1044243 | 9/1966 | United Kingdom . | |
| 1108705 | 4/1968 | United Kingdom . | |
| 1130371 | 10/1968 | United Kingdom . | |
| 2087065 | 5/1982 | United Kingdom | 60/757 |

*Primary Examiner*—Louis J. Casaregola
*Assistant Examiner*—Timothy S. Thorpe
*Attorney, Agent, or Firm*—Cushman, Darby & Cushman

[57] ABSTRACT

A cooled wall structure for a gas turbine engine comprises a perforated and an inner wall in which the walls are capable of relative movement to cope with the thermal strains experienced by the combustion chamber during operation of the engine. The inner wall comprises a number of wall elements attached to the outer wall in the manner of overlapping tiles. Each wall element is immovably secured to the outer wall at the mid-point of its downstream end and the sides of each wall element are movably attached to the outer wall adjacent the sides of the downstream end of the wall element.

The upstream end of each wall element is located between the outer wall and an adjacent flow in either an upstream or a downstream direction between the walls.

The wall elements can have a plurality of raised lands to increase the surface area of the elements and to protect the incoming cooling air against the cross-flow of cooling air already flowing in the wall structure.

11 Claims, 13 Drawing Figures

WALL STRUCTURE FOR A COMBUSTION CHAMBER

This invention relates to a wall structure for a combustion chamber, for example the combustion chamber of a gas turbine engine.

In such combustion chambers there is an ever present need to cool the chamber walls in order to keep the walls at an acceptable temperature and the cooling should be achieved using the minimum quantity of cooling air so as not to reduce the engine efficiency to too great an extent. Various cooling methods have been proposed and some put into practice, including the provision of cooling rings let into the chamber walls and the use of a wall construction comprising two or more layers of material in which the cooling air passes through the wall via internal passages and openings in the inner and outer walls. The present invention is concerned with this latter type of cooling method.

Combustion chamber walls which comprise two or more layers whilst being advantageous in that they may only require a relatively small flow of air to achieve adequate cooling are prone to some problems. These may include blockage of the internal flow passages and the openings in the layers, the layers may be expensive to produce and join together and the fabrication of such a laminated structure into a combustion chamber without adversely affecting the cooling efficiency can be difficult. A further problem is that due to the temperature differential across the chamber wall and the cyclic nature of the engine operation of which the combustion chamber forms a part, such a wall construction is susceptible to cracking.

The present invention seeks to provide a wall construction for a gas turbine engine combustion chamber in which the differential thermal expansion and contraction experienced by the chamber wall can be accommodated without adverse effect on the integrity of the combustion chamber.

The present invention provides a wall structure for gas turbine engine combustion equipment in which the wall structure comprises at least an outer and an inner wall, the outer wall being perforate to allow a flow of cooling air to enter the space between the outer and inner walls, the wall structure having outlets to allow the cooling air to flow from the space between the outer and inner walls to the interior of the combustion equipment; the inner wall comprising a plurality of wall elements, each wall element having a positive attachment to the outer wall at one end thereof and being located at the opposite end thereof between the outer wall and an end of an adjacent wall element, the said location and positive attachment of each wall element allowing relative movement to take place between the outer wall and the wall elements of the inner wall in two directions normal to each other.

Each wall element may comprise a base portion, a centrally positioned upstanding pin which in use can be located in an opening in the outer wall and secured e.g. by welding, to the outer wall, two further pins, one on each side of the central pin which can also be located in suitable openings in the outer wall, but secured to the outer wall in such way as to allow at least limited movement in one or more of the radial, the circumferential or the axial directions, and a locating portion which can form part of the base portion.

The locating portion may be an extension of the base portion which can be located between the outer wall and an upstanding feature of an adjacent wall element or it can comprise a flange which can be located between the outer wall and the base portion of an adjacent wall element.

Each wall element can have apertures at either or both ends to allow the cooling air to exhaust into the combustion equipment at either of said ends, so that the cooling air can flow through the wall structure in a general downstream direction or in counter-flow to the general flow direction of the cooling air external of the wall structure.

Each wall element may have a plurality of upstanding lands which in association with the outer wall define a number of internal cooling air flow passages and the outer wall has a plurality of apertures for the entry of cooling air, each of said apertures being located between two of said lands, in the upstream and downstream axial direction.

The wall elements may be secured to the outer wall in rows in the manner of roofing tiles, e.g. adjacent rows are staggered and alternate rows are aligned with respect to each other.

The wall structure of the present invention can be used for the three main types of gas turbine engine combustion equipment, e.g. the multiple chamber, the tubo-annular chamber and the annular chamber.

The present invention will now be more particularly described with reference to the accompanying drawings in which:

FIG. 1 shows a gas turbine engine having combustion equipment with a wall structure in accordance with the present invention, FIG. 2 shows the combustion equipment, e.g. an annular combustion chamber, of the engine shown in FIG. 1 to a larger scale, FIG. 3 shows the wall structure of the annular combustion chamber to a larger scale, FIG. 4 shows an alternative wall structure to that shown in FIG. 3.

Figure 1:
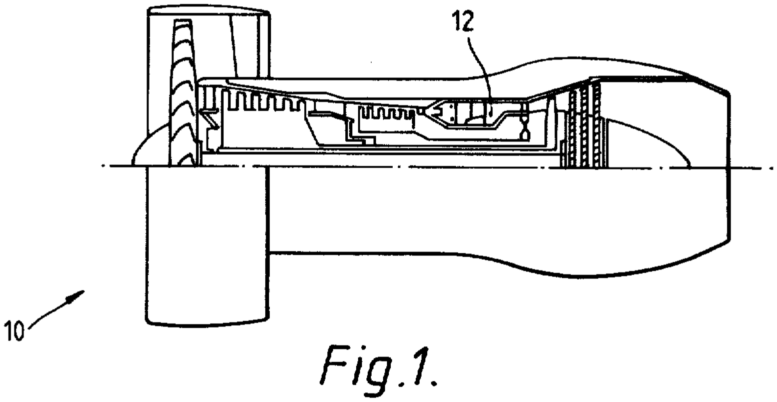
Figure 2:
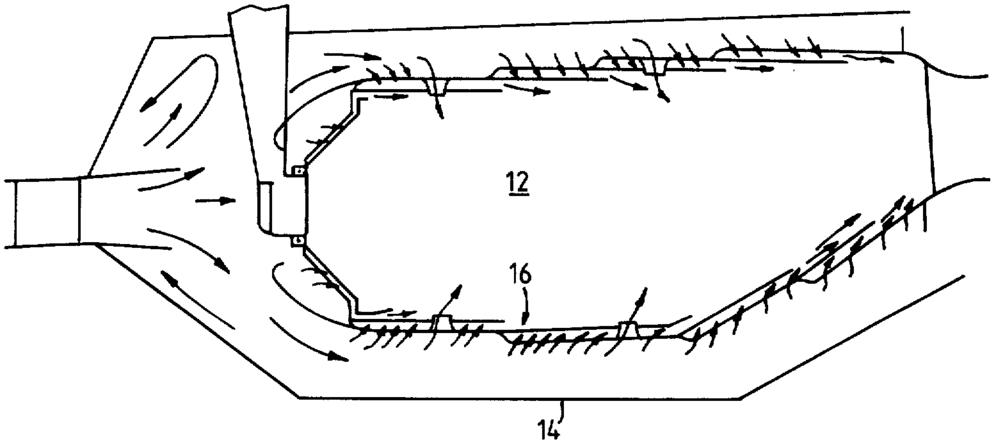
Figure 3:
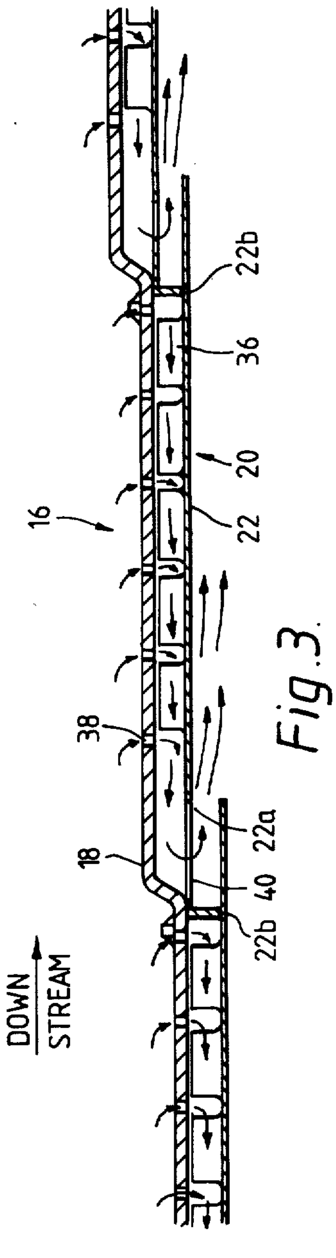
Figure 4:
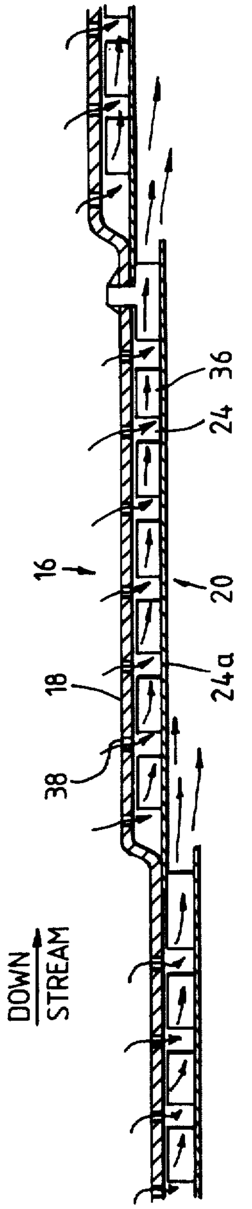
Figure 7:
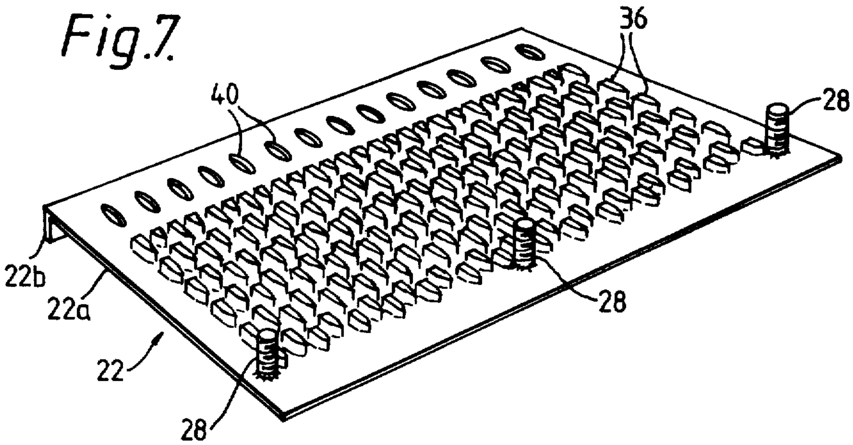
Figure 8:
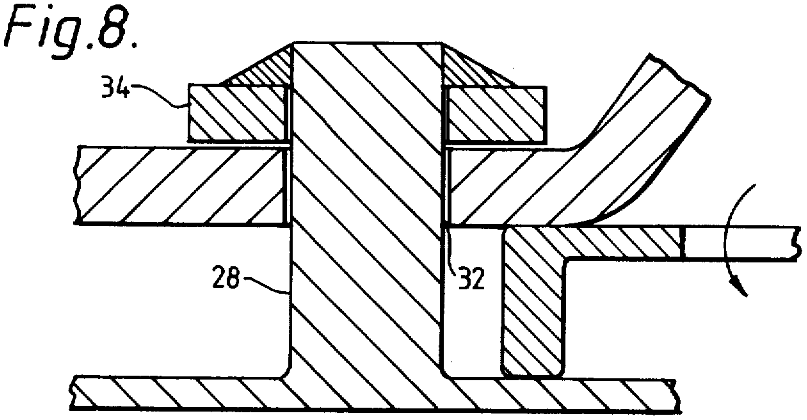
Figure 9:
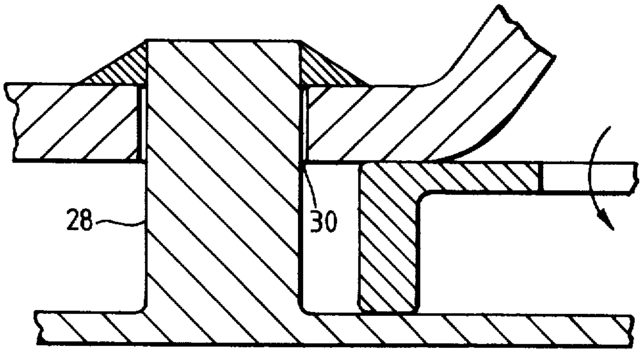
Figure 10:
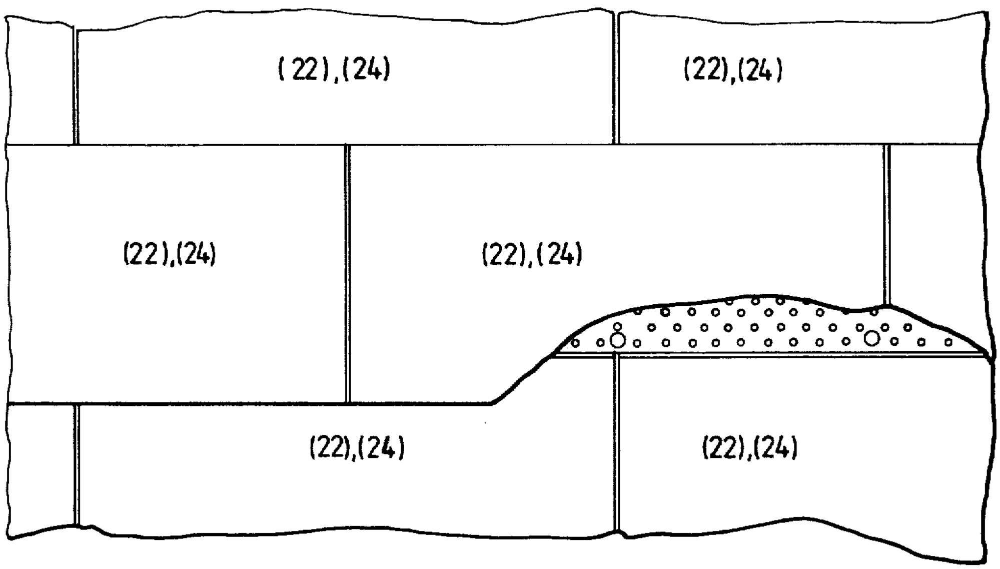
Figure 11:
Figure 12:
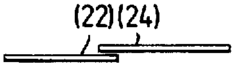
Figure 13:
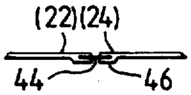

FIG. 7 is a perspective view of the wall element of the wall structure shown in FIG. 3, FIGS. 8 and 9 show the attachment of the rear of the wall element shown in FIG. 7 to the outer wall of the wall structure shown in FIGS. 3 and 4 at the central and side locations respectively, FIG. 10 is a view on arrow 'A' in FIGS. 3 and 4 illustrating the overlap between adjacent rows of wall elements, and FIGS. 11, 12 and 13 illustrate different methods of overlapping between adjacent rows of wall elements.

Referring to the Figures a gas turbine engine 10 of the front fan, high by-pass ratio type has combustion equipment in the form of an annular combustion chamber 12 in an annular casing 14.

The annular chamber 12 has a wall structure 16 comprising an outer wall 18 and an inner wall 20, which is composed of a plurality of wall elements 22 (FIG. 3) and 24 (FIG. 4). The common features of the wall elements 22, 24 in FIGS. 3 and 4 are that each has a base portion *22a, 24a* respectively, a plurality of raised lands 36 and three attachment features 28 (FIGS. 7, 8 and 9) at the downstream end of the element. Each attachment feature comprises a pin, the central one 28a of which passes through an opening 30 in the outer wall and is secured to the outer wall, e.g. by welding. The pin 28b on each side of the central pin 28a passes through an opening 32 and a collar 34 is attached to each outer pin 28b. Thus the downstream end of each wall element is securely attached to the outer wall by the central pin 28a and is located on the outer wall by the outer pins 28b so that the wall element moves to a limited extent in one or more of the axial, circumferential or radial directions with respect to the central pin (see FIGS. 8 and 9).

Each wall element also has a plurality of raised lands 36 which will be described in more detail with reference to FIGS. 5, 6 and 7.

In FIG. 3, the base portion 22a has an inwardly directed flange 22b, and this flange on each wall element is located between the outer wall 18 and the base portion of an adjacent wall portion so that the upstream end of each wall portion can move to a limited extent relative to the outer wall. In this arrangement, cooling air, typically bled from the engine compressor, flows into the space between the outer and inner walls through apertures 38 in the outer wall and since the flange 22b prevents exhaust of the cooling air in the downstream direction, the cooling air flows in an upstream direction and exhausts into the combustion chamber through openings 40 in the base portion 22a.

In FIG. 4, the base portion 24a does not have a flange but extends further in the downstream direction so that the extension is located between the outer wall and the most downstream of the lands 36. In this way the upstream end of each wall portion can move as described with reference to FIG. 3. In this arrangement, the cooling air flowing through the apertures 38 continues to flow in a generally downstream direction and exhausts from the wall structure into the combustion chamber between adjacent ones of the most downstream lands 36 of each wall element.

Figure 5:
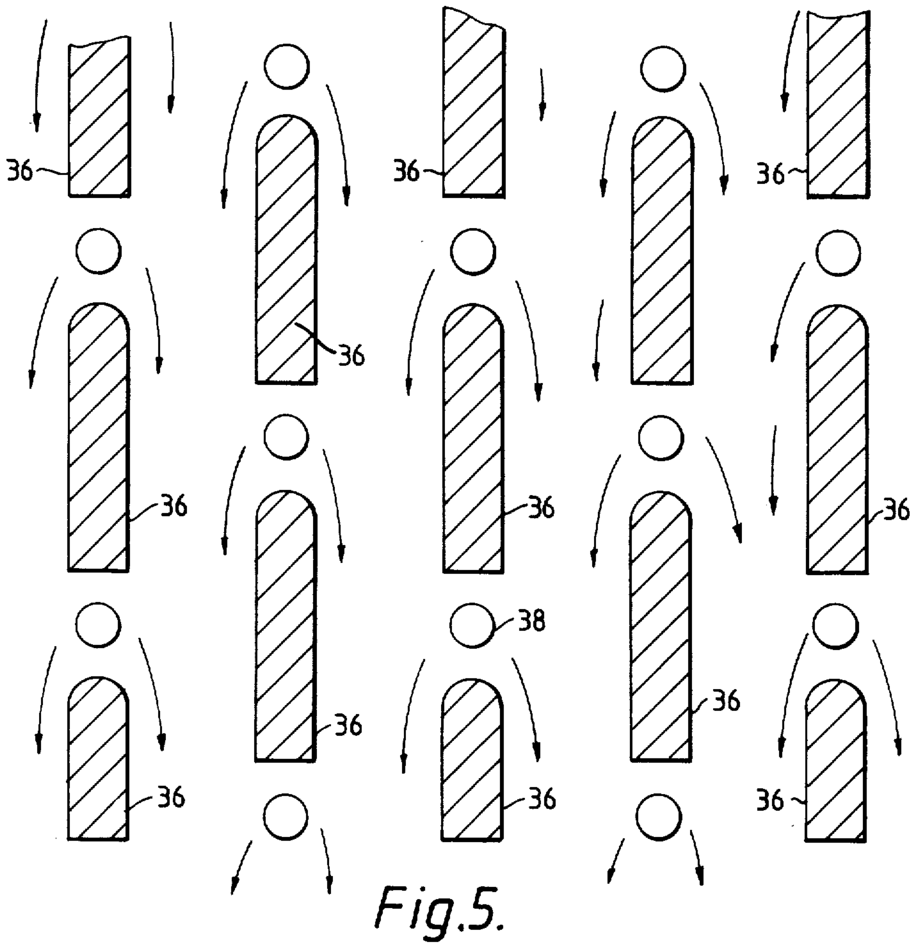
FIG. 5 shows a plan view of that part of the wall structure common to FIGS. 3 and 4 to a greater scale.
Figure 6:
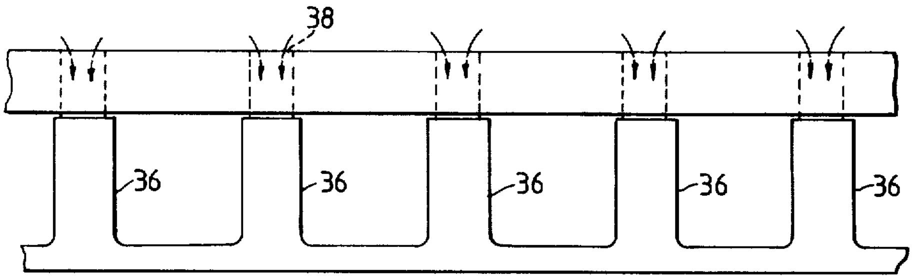
FIG. 6 is an elevation of the wall structure shown in FIG. 5.

Referring now more particularly to FIGS. 5, 6 and 7, the raised lands 36 are arranged in axially aligned rows, in which adjacent rows are staggered with respect to one another. Each raised land has a rounded nose and a bluff base and the lands 36 and the inlet apertures 38 in the outer wall are arranged with respect to each other so that each aperture is located between adjacent lands in a row. In this way the incoming cooling air is shielded by the adjacent land from the cooling air which has already entered the flow passages formed by the lands in co-operation with the outer and inner walls of the wall structure. This arrangement of wall structure is analogous to that discussed in U.S. Pat. No. 4,064,300 issued Dec. 20, 1977 to Bhangu and commonly assigned to Rolls-Royce Limited, London, England. In that specification the lands and cooling air inlets were arranged in a similar manner to that shown here but the inner and outer walls were attached securely to each other through the lands, whereas in this invention the inner and outer walls are separate from each other and the attachment between the walls allows for a certain amount of relative movement.

The lands 36 on the wall element in FIG. 4 are arranged in a similar manner except that because the flow in the wall structure is in the opposite direction the upstream end of each land will be round-nosed and the downstream end will be bluff-based, e.g. opposite to that in the FIG. 3 arrangement.

FIG. 10 illustrates how the wall elements of FIG. 3 or 4 can be attached to the outer wall to prevent or minimise cooling air leakage between adjacent elements. The wall elements are arranged in rows 22, 24 and adjacent rows are staggered with respect to each other rather in the manner of roofing tiles.

The elements can simply overlap as shown in FIG. 12 or an overlap seal can be welded on one side of each element or a sealing strip 44 can be located in a slot 46 along the edge of each element as shown in FIG. 13.

For ease of manufacture, each wall element can be cast to size using a method in which the casting is vacuum assisted.

Although the invention has been described in which the interior of the wall structure has been divided up into cooling air flow passages by the raised lands, it may be possible to achieve adequate cooling without these lands or the cooling air flow passages can be in a different configuration using different formations of lands. The wall structure according to the invention can be applied to the whole of the combustion chamber if desired or selected parts only.

In use, cooling air passes through the apertures 38 in the outer wall which is relatively cool and impinges on the relatively hot wall element and flows out either through the apertures 40 (FIG. 3) or between adjacent lands 36 at the downstream end of each wall element which would then protect the next downstream wall element (FIG. 4). The lands 36 serve two purposes, that of increasing the surface area of the wall element and to shield the incoming jets of cooling air from the cooling air cross-flow, as mentioned above.

We claim:

1. A wall structure for gas turbine engine combustion equipment, the wall structure comprising: at least an outer wall and an inner wall spaced therefrom, said outer wall being perforate to allow a flow of cooling air to enter the space between the outer and inner walls, the wall structure having outlets to allow cooling air to flow from the space between the outer and inner walls to the interior of the combustion equipment, said inner wall comprising a plurality of circumferentially and axially arranged wall elements, each inner wall element having an upstream end and a downstream end, means for positively attaching the downstream end of each inner wall element to the outer wall, each upstream end of each inner wall element being located between the downstream end of an axially adjacent inner wall element and the outer wall, said means of positive attachment of each inner wall element including a non-movable attachment point positioned circumferentially in the center of the downstream end of said inner wall element and two further attachment points positioned circumferentially on each side of said centrally positioned attachment point for permitting relative movement of said wall element in an axial and a circumferential direction, and a plurality of raised lands extending from each inner wall element toward and terminating short of said outer wall, said lands defining a plurality of internal flow passages for the cooling air.

2. A wall structure as claimed in claim 1 in which the raised lands are arranged in rows adjacent rows being staggered with respect to each other.

3. A wall structure as claimed in claim 2 in which said perforate outer wall includes a plurality of apertures for the inlet of cooling air, each one of said apertures being located between adjacent ones of the lands in said rows of lands.

4. A wall structure as claimed in claim 1 in which the said opposite end of each wall element, is located between the outer wall and some of the raised lands of an adjacent wall element, the cooling air flow being in a generally downstream direction through the space between the outer and inner walls.

5. A wall structure as claimed in claim 1 in which each wall element has a flange at the said opposite upstream end thereof, the flange being located between the outer wall and the downstream end of an adjacent wall element, the cooling flow of air in the space between the inner and outer walls being in an upstream direction and entering the combustion equipment through apertures adjacent the flange.

6. A wall structure as claimed in claim 1 in which each raised land has in the direction of flow of cooling air thereby, a rounded nose and a bluff-base.

7. A wall structure as claimed in claim 1 in which the combustion equipment includes one or more combustion chambers, the wall or walls of which are at least partially formed of said wall structure.

8. A gas turbine engine combustion chamber wall structure comprising an outer wall and an inner wall spaced therefrom, said outer wall at least partially being in a stepped form and having a plurality of apertures therethrough for inlet of cooling air to the space between the outer wall and the inner wall, outlets to allow the cooling air to flow from the space between the outer wall and the inner wall into the combustion chamber, said inner wall comprising a plurality of wall elements each having an upstream end and a downstream end, means for attaching the downstream end of each inner wall element to the outer wall, said means including a first means for rigidly attaching each inner wall element at a central position of the downstream end thereof to the outer wall and a second means movably attaching each inner wall element at positions on the downstream end thereof opposite said first means to the outer wall, and said upstream end of each inner wall element being movably positioned between the outer wall and the downstream end of an adjacent inner wall element.

9. A wall structure as claimed in claim 8 in which each wall element includes a plurality of raised lands extending therefrom and terminating short of said outer wall, said lands being arranged in a series of rows, adjacent ones of which are staggered with respect to each other, each aperture in the outer wall being located between adjacent ones of the raised lands in the rows of raised lands, each raised land having in the direction of cooling air flow thereby a rounded nose and a bluff base.

10. A wall structure as claimed in claim 9 which each wall element is located between the outer wall and some of the raised lands of an adjacent wall element, the cooling air flow through the space between the outer and inner walls being in a generally downstream direction, the cooling air leaving the said space at the downstream end of each wall element.

11. A wall structure as claimed in claim 9 in which each wall element has a flange at the upstream end thereof, the flange being located between the outer wall and an adjacent wall element, the cooling air flow through the space between the outer and inner walls being in a generally upstream direction and leaving the said space through apertures adjacent the upstream end of the wall element.

* * * * *